United States Patent [19]
Nanamatsu et al.

[11] 3,747,022
[45] July 17, 1973

[54] STRONTIUM NIOBATE ELECTRO-OPTIC MODULATOR

[75] Inventors: Satoshi Nanamatsu; Masakazu Kimura; Kikuo Doi, all of Tokyo, Japan

[73] Assignee: Nippon Electric Company, Limited, Tokyo, Japan

[22] Filed: Mar. 19, 1971

[21] Appl. No.: 126,229

[30] Foreign Application Priority Data

March 20, 1970 Japan..........................45/24316

[52] U.S. Cl.................. 332/7.51, 350/160, 252/300
[51] Int. Cl............................................. H01s 3/02
[58] Field of Search................... 332/7.51; 350/150, 350/160, 161; 252/300

[56] References Cited
OTHER PUBLICATIONS

Isupou, "Dielectric Constant of Niobates & Tantalates of Bivalent Metals," 1957, pg. 17291-b, Chem. Abst., Vol. 5.

Raminow et al., "Electro Optic Light Modulators," Pg. 1612–1628, 10/66, Applied Optics, Vol. 5, No. 10.

Brocale et al., "The Design of Broadband Light Modulators," 3/28/69, pg. 185–191, The Radio & Elec. Engineer, Vol. 39, No. 4.

Sprague, "Preparation of Cranic Material," 8/26/63, pg. 2726B, Chem. Abst., Vol. 63, 1965.

*Primary Examiner*—Benjamin A. Borchelt
*Assistant Examiner*—N. Moskowitz
*Attorney*—Sandoe, Hopgood & Calimafde

[57] ABSTRACT

A single domain crystal of strontium niobate exhibits a substantial transverse electro-optic effect. Intensity, frequency and phase modulators for laser beams, or the like either continuous or pulse, utilizing the strontium niobate crystal may be operated over a broad bandwidth including the visible spectrum at low modulation voltage and power.

4 Claims, 2 Drawing Figures

PATENTED JUL 17 1973 3,747,022

INVENTORS
SATOSHI NANAMATSU
MASAKAZU KIMURA
KIKUO DOI
by
Sandoe, Hopgood & Calimafde
ATTORNEYS

STRONTIUM NIOBATE ELECTRO-OPTIC MODULATOR

BACKGROUND OF THE INVENTION

This invention relates generally to modulators for electromagnetic wave at frequencies including those of the visible spectrum, and more particularly to modulators for coherent light beams of the type operating on the electro-optic principle. Electro-optic modulators depend for their operation upon a single crystal material which modifies a transmission property of a transmitted electromagnetic wave by the application of an electric field. Such modulators may be continuous or pulse and may result in a variation in the intensity, frequency or phase of the transmitted electromagnetic wave.

Potassium dihydrogen phosphate (KDP) is the material most commonly employed in electro-optic modulators, at the present time. The crystal of KDP is, however, inadequate to practical usage because of its deliquescence and brittleness, the latter quality causing difficulties in cutting and polishing the crystal.

Lithium niobate ($LiNbO_3$) single crystal has been recently found to be a physically and chemically stable material for use in light modulators. This crystal can be readily grown in a crystal size necessary for modulators by the Czochralski method and can be readily cut and polished. The electro-optic effect of this crystal is greater than that of KDP. However, this crystal has a major deficiency in that irradiation of the crystal by the electromagnetic wave causes a change in the refractive index of the irradiated part of the crystal causing a so-called radiation damage.

Lithium tantalate ($LiTaO_3$) has been found to be a suitable material for use as an optical modulator which shows no evidence of radiation damage and has all of the excellent physical and chemical stability and electro-optic activity of $LiNbO_3$. However, the modulating properties of $LiTaO_3$ is insufficient for use in broadband, highly sensitive modulators.

SUMMARY OF THE INVENTION

In accordance with the invention, single domain crystals of an approximate nominal composition $Sr_2Nb_2O_7$ have been found to exhibit a greater electro-optic effect than that of $LiTaO_3$. Like $LiTaO_3$, $Sr_2Nb_2O_7$ manifests no radiation damage when irradiated by electromagnetic wave over long periods, has excellent physical and chemical stability, and can be readily grown in large crystal by conventional techniques such as the Czochralski method and floating zone technique to yield a uniform single crystal of good quality.

Electro-optic modulators of the invention utilizing $Sr_2Nb_2O_7$ single crystals can operate either continuous or pulse and result in either intensity, frequency, or phase variation of the electromagnetic wave with broad bandwidths. A particular advantage of the invention resides in that the modulator operates with high efficiency at a sufficiently low modulating voltage, so that the modulating circuit may be transistorized and the over-all modulator may be miniaturized.

DETAILED DESCRIPTION

Preparation of $Sr_2Nb_2O_7$ Single Crystal

The preferable starting materials for the preparation of a $Sr_2Nb_2O_7$ single crystal are strontium carbonate and niobium oxide, although other materials may be used which decompose into strontium or niobium oxide at elevated temperatures during preparation. The starting materials are weighed so that the molecular ratio of strontium oxide (SrO) to niobium oxide ($Nb_2O_5$) in the final product is 2 : 1, admixed and sintered at a temperature of about 1,250° C to yield $Sr_2Nb_2O_7$ polycrystals by solid reaction.

The melting point of $Sr_2Nb_2O_7$ is about 1,700° C. According to crystal growth by the Czochralski method, the sintered material is filled into an iridium crucible made, molten, and then pulled from the crucible at a rate of about 6mm per hour. With the floating zone technique, a ceramic rod is formed from the sintered material in the first place. The ceramic rod and a seed crystal may then be placed in an image furnace as disclosed in IEEE TRANSACTIONS ON MAGNETICS, Vol. MAG-5, No. 3, September 1969, p. 286, FIG. 1, rotated in opposite directions to each other at 30 RPM and moved downward in air at a zone speed of 10mm per hour. The transparent crystal obtained by this process is about 5mm in diameter and 40mm in length and its density is 5.1 gram per $cm^3$.

The single crystal can be prepared even if the molecular ratio of SrO to $Nb_2O_5$ varies from the stoichiometric composition (2 : 1) within a range of 1.7 : 1 to 2.4 : 1.

General Properties of $Sr_2Nb_2O_7$ Single Crystal

1. $Sr_2Nb_2O_7$ single crystal belongs to the rhombic crystal system and the $C_{2v}$ crystallographic point group. This is a biaxial crystal with its optical plane parallel to the c-plane. The crystal has a natural cleavage parallel to the b-plane and a bisectrix of the optical angle normal to the b-plane. The lattice constants $a$, $b$ and $c$ satisfy the relation $a < c < b$.

2. $Sr_2Nb_2O_7$ single crystal is ferroelectric and its Curie point is near 1,350° C. The direction of spontaneous polarization is along the c-axis and a D–E hysteresis loop can be observed at room temperature. Values of spontaneous polarization and coercive field are 9 $\mu C/cm^2$ and 6 kV/cm, respectively.

3. The single crystal is chemically and physically stable and shows no measurable deterioration upon exposure to any normally encountered atmosphere.

4. $Sr_2Nb_2O_7$ single crystal manifests a linear electro-optic effect. The effect is largest when a voltage is applied along the c-axis and light is propagated along the b-axis. In this case, the half-wave field-distance product is approximately 1,800 volts at 6,328 angstrom units.

Figure 1:
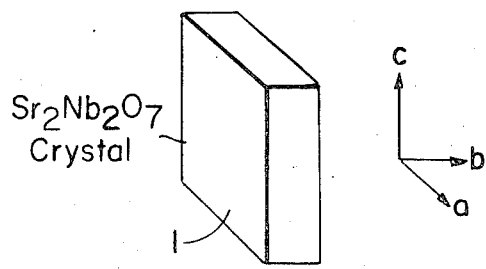
FIG. 1 is a perspective view of an example of a $Sr_2Nb_2O_7$ single crystal cut for electro-optic measurement with a representation of the crystallographic axes.

Referring to FIG. 1, the half-wave field-distance product $[E.1]\lambda/2$ was measured under conditions in which a He-Ne laser beam having a wave length of 6,328 angstroms propagated through a single domain crystal 1 of $Sr_2Nb_2O_7$ having a size of 2.29mm (a-axis direction) × 0.96mm (b-axis) × 3.21mm (c-axis). The values obtained were 1,800 volts when a DC electric field was applied along the c-axis and a laser beam was propagated along the b-axis, 4,300 volts for an electric field applied along the c-axis and a laser beam along the $a$-axis, 5,000 volts for an electric field applied along the $a$-axis and laser light along the $b$-axis, 32,000 volts for an electric field applied along the $a$-axis and laser light along the $c$-axis, 135,000 volts for an electric field applied along the $b$-axis and laser light along the $a$-axis, and 750,000 volts for an electric field applied along the $b$-axis and laser light along the $c$-axis.

The best value, 1,800 volts, obtained for the strontium niobate crystal is smaller than that of KDP (4,000 volts), LiNbO$_3$ (2,600 volts) or LiTaO$_3$ (2,700 volts).

5. The single strontium niobate crystal shows no radiation damage. After the crystal was irradiated by a He–Ne laser beam (6,328 angstrom) of a power of 6 miliwatts and a beam diameter of 70 microns for 2 hours, there was no evidence of radiation damage to the crystal.

6. The relative dielectric constants $\epsilon_a{}^T$, $\epsilon b^T$ and $\epsilon_c{}^T$ of the crystal measured at 1 kHz at room temperature are 75, 46 and 43, respectively. The value of $\epsilon_c{}^T$ is small enough, and is similar to that of KDP (50), LiNbO$_3$ (28) and LiTaO$_3$ (47).

7. The single strontium niobate crystal has a large piezoelectric activity. The electromechanical coupling coefficient $k_{33}$ is 26 percent, which is larger than that of the LiTaO$_3$ single crystal (21 percent).

It will be understood from items (3) to (6) that the Sr$_2$Nb$_2$O$_7$ single crystal is the most excellent material for use in electro-optic modulators that has thus far been proposed. Its figure of merit $1/(\epsilon.[E.1]\lambda/2^2)$ is 5.7 times that of KDP, 1.4 times that of LiNbO$_3$ and 2.5 times of LiTaO$_3$.

It is noted that Sr$_2$Nb$_2$O$_7$ in a ceramic form has been reported by Smolenskii et al. in Soviet Physics-Doklady 1 (1956), 300, who only measured its dielectric constant and tan $\delta$. The remarkable utility of Sr$_2$Nb$_2$O$_7$ single domain single crystal particularly in the field of light, however, discovered for the first time by the present invention.

EXAMPLE

Figure 2:
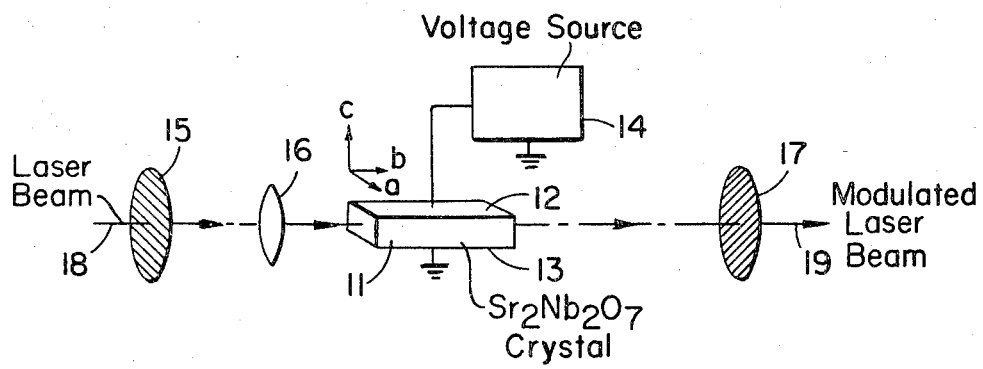
FIG. 2 is a schematic diagram of a $Sr_2Nb_2O_7$ modulator according to a preferred embodiment of the invention.

Referring to FIG. 2, an electro-optic modulator embodying the invention utilizes a rectilinear body 11 of single domain single crystal strontium niobate of dimensions 0.2mm (a-axis direction) by 7.2mm (b-axis direction) by 0.2mm (c-axis direction). A pair of electrodes 12 and 13 are attached to the two upper and lower surfaces of the crystal 11 normal to the c-axis, across which a modulating electric field is applied from a conventional voltage source 14. The crystal 11 is placed between a pair of crossed polarizers 15 and 17 which have their polarization directions respectively oriented at +45° and −45° with respect to the c-axis of the crystal 11. A light beam 18 such as that from a He–Ne laser is polarized by the polarizer 15, focused on the crystal 11, propagated through the crystal along the b-axis thereof, and subjected to modulation by the electric field applied along the c of the crystal. The modulated light beam 19 is led out through the analyzer polarizer 17.

In the electro-optic modulator of FIG. 2, the half wave voltage necessary to achieve 100 percent modulation of the light beam is as small as 50 volts and the capacitance of the crystal 11 is as low as 2.7 picofarad. Therefore, the voltage source 14 can be realized by a conventional transistor circuit.

It is understood that the invention has been described with reference to a preferred embodiment thereof and that variations are to be included within the scope of the invention. For example, although the directions of the light beam and electric field are specifically described as being along the b-axis and c-axis, respectively, they may be along the other axes as well. Furthermore, frequency or phase modulation of the light beam by the modulator is possible, although the embodiment specifically described performs intensity modulation. Furthermore, although reference is made in the specification and claims to the nominal composition Sr$_2$Nb$_2$O$_7$, the electro-optic effect is observed over a compositional range within which the molecular ratio of SrO to Nb$_2$O$_5$ varies from 1.7 : 1 to 2.4 : 1. Small amounts of additives in the crystal may thus be tolerated, and all such variations are to be included within the terminology "nominal composition."

What is claimed is:

1. A modulator for modulating a coherent beam of electromagnetic wave comprising an electro-optic crystalline body, means for transmitting said coherent beam into said crystalline body, means for impressing an electric field across said crystalline body in a direction to modify a transmission property of said beam, said crystalline body including a single domain, single crystal of a chemical composition (SrO) × Nb$_2$O$_5$ in which X ranges from 1.7 to 2.4.

2. The modulator as claimed in claim 1, in which said coherent beam is transmitted into said body along the crystallographic b-axis of said body, and said electric field is impressed along the crystallographic c-axis of said body.

3. The modulator as claimed in claim 2, in which said body has a rectilinear shape elongated along the crystallographic b-axis of said crystalline body.

4. The modulator as claimed in claim 1, in which said crystalline body has a chemical composition Sr$_2$Nb$_2$O$_7$.

* * * * *